United States Patent
Tian et al.

(10) Patent No.: US 9,028,948 B2
(45) Date of Patent: May 12, 2015

(54) ABRASIVE ARTICLES INCLUDING ABRASIVE PARTICLES BONDED TO AN ELONGATED BODY, AND METHODS OF FORMING THEREOF

(75) Inventors: Yinggang Tian, Shrewsbury, MA (US); Ran Ding, Bolton, MA (US); Susanne Liebelt, Norderstedt (DE); Krishnamoorthy Subramanian, Lexington, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 633 days.

(21) Appl. No.: 12/857,374

(22) Filed: Aug. 16, 2010

(65) Prior Publication Data
US 2011/0045292 A1 Feb. 24, 2011

Related U.S. Application Data

(60) Provisional application No. 61/234,205, filed on Aug. 14, 2009.

(51) Int. Cl.
| | | |
|---|---|---|
| *D06N 7/02* | (2006.01) | |
| *D02G 3/00* | (2006.01) | |
| *B28D 1/02* | (2006.01) | |
| *B23D 61/18* | (2006.01) | |
| *B23D 65/00* | (2006.01) | |
| *B24D 3/06* | (2006.01) | |

(52) U.S. Cl.
CPC ......... *B23D 61/185* (2013.01); *Y10T 428/2927* (2015.01); *Y10T 428/2944* (2015.01); *B23D 65/00* (2013.01); *B24D 3/06* (2013.01)

(58) Field of Classification Search
None
See application file for complete search history.

(56) References Cited

U.S. PATENT DOCUMENTS

| | | | |
|---|---|---|---|
| 2,764,543 A * | 9/1956 | Comstock et al. | ............ 204/217 |
| 2,784,536 A | 3/1957 | Barron | |
| 2,793,478 A | 5/1957 | Rohowetz | |
| 3,150,470 A | 9/1964 | Barron | |
| 3,178,273 A | 4/1965 | Libal | |
| 3,854,898 A | 12/1974 | Whitney, Jr. et al. | |

(Continued)

FOREIGN PATENT DOCUMENTS

| | | |
|---|---|---|
| CH | 599837 A5 | 5/1978 |
| CN | 1456410 A | 11/2003 |

(Continued)

OTHER PUBLICATIONS

Handbook of Thermoset Plastics, 2nd edition, p. 28, 1998.*

(Continued)

*Primary Examiner* — David Sample
*Assistant Examiner* — Nicole T Gugliotta
(74) *Attorney, Agent, or Firm* — Joseph P. Sullivan; Abel Law Group, LLP

(57) ABSTRACT

An abrasive article includes an elongated body, a bonding layer including a metal overlying a surface of the elongated body, and a coating layer including a polymer material overlying the boding layer. The abrasive article further includes abrasive grains contained within the bonding layer and coating layer, and wherein the bonding layer comprises an average thickness ($t_{bl}$) at least about 40% of the average grit size of the abrasive grains.

19 Claims, 5 Drawing Sheets

(56) References Cited

U.S. PATENT DOCUMENTS

| | | |
|---|---|---|
| 3,884,212 A | 5/1975 | Armstrong et al. |
| 3,894,673 A | 7/1975 | Lowder et al. |
| 3,906,684 A | 9/1975 | Marshall et al. |
| 3,997,302 A | 12/1976 | Supkis |
| 4,015,931 A | 4/1977 | Thakur |
| 4,018,576 A | 4/1977 | Lowder et al. |
| 4,055,700 A | 10/1977 | Ronnquist et al. |
| 4,187,828 A | 2/1980 | Schmid |
| 4,384,564 A | 5/1983 | Smith et al. |
| 4,485,757 A | 12/1984 | Ebner |
| 4,627,950 A | 12/1986 | Matsui et al. |
| 4,643,740 A | 2/1987 | Nicolson |
| 4,646,710 A | 3/1987 | Schmid et al. |
| 4,681,538 A | 7/1987 | DeLuca et al. |
| 4,684,052 A | 8/1987 | McDonald et al. |
| 4,727,852 A | 3/1988 | Schmid et al. |
| 4,776,862 A | 10/1988 | Wiand |
| 4,866,888 A | 9/1989 | Murai et al. |
| 4,907,564 A | 3/1990 | Sowa et al. |
| 4,968,326 A | 11/1990 | Wiand |
| 4,974,373 A | 12/1990 | Kawashima et al. |
| 5,062,865 A | 11/1991 | Chen et al. |
| 5,127,197 A | 7/1992 | Brukvoort et al. |
| 5,127,924 A | 7/1992 | Russell |
| 5,213,591 A | 5/1993 | Celikkaya et al. |
| 5,218,949 A | 6/1993 | Tomlinson et al. |
| 5,250,084 A | 10/1993 | Lansell et al. |
| 5,251,802 A | 10/1993 | Bruxvoort et al. |
| 5,318,604 A | 6/1994 | Gorsuch et al. |
| 5,377,568 A | 1/1995 | Hauser |
| 5,377,659 A | 1/1995 | Tank et al. |
| 5,383,443 A | 1/1995 | Buyens |
| 5,438,973 A | 8/1995 | Schmid et al. |
| 5,454,750 A * | 10/1995 | Cosmano et al. ............. 451/526 |
| 5,492,771 A | 2/1996 | Lowder et al. |
| 5,496,386 A | 3/1996 | Broberg et al. |
| 5,511,718 A | 4/1996 | Lowder |
| 5,544,643 A | 8/1996 | Bauer et al. |
| 5,571,296 A | 11/1996 | Barber, Jr. et al. |
| 5,578,098 A | 11/1996 | Gagliardi et al. |
| 5,616,065 A | 4/1997 | Egglhuber |
| 5,643,055 A | 7/1997 | Linzell |
| 5,660,320 A | 8/1997 | Hoffmuller et al. |
| 5,707,509 A * | 1/1998 | Hartweg ...................... 205/763 |
| 5,840,089 A | 11/1998 | Chesley et al. |
| 5,846,269 A | 12/1998 | Shiue et al. |
| 5,855,314 A * | 1/1999 | Shiue et al. ................ 228/124.5 |
| 5,913,305 A | 6/1999 | Hauser |
| 5,924,917 A | 7/1999 | Benedict et al. |
| 5,935,407 A | 8/1999 | Nenov et al. |
| 5,964,210 A | 10/1999 | Hodsden |
| 5,975,988 A | 11/1999 | Christianson |
| 6,056,794 A | 5/2000 | Stoetzel et al. |
| 6,065,462 A | 5/2000 | Hodsden et al. |
| 6,070,570 A | 6/2000 | Ueoka et al. |
| 6,102,024 A | 8/2000 | Buljan et al. |
| 6,194,068 B1 | 2/2001 | Ohashi et al. |
| 6,194,086 B1 | 2/2001 | Nenov et al. |
| 6,228,133 B1 | 5/2001 | Thurber et al. |
| 6,279,564 B1 | 8/2001 | Hodsden et al. |
| 6,286,498 B1 | 9/2001 | Sung |
| 6,311,684 B1 | 11/2001 | Hodsden et al. |
| 6,319,108 B1 | 11/2001 | Adefris et al. |
| 6,368,198 B1 | 4/2002 | Sung et al. |
| 6,463,921 B2 | 10/2002 | Shimazaki et al. |
| 6,613,113 B2 | 9/2003 | Minick et al. |
| 6,679,243 B2 | 1/2004 | Sung |
| 6,755,720 B1 * | 6/2004 | Ishizaki et al. .................. 451/28 |
| 6,783,442 B2 | 8/2004 | Lukschandel et al. |
| 6,830,598 B1 | 12/2004 | Sung |
| 6,858,050 B2 | 2/2005 | Palmgren |
| 6,899,920 B2 | 5/2005 | Meyer |
| 6,915,796 B2 | 7/2005 | Sung |
| 6,939,413 B2 | 9/2005 | Crockett |
| 7,089,925 B1 | 8/2006 | Lin et al. |
| 7,124,753 B2 | 10/2006 | Sung |
| 7,134,430 B2 | 11/2006 | Kim et al. |
| 7,261,752 B2 | 8/2007 | Sung |
| 7,306,508 B2 | 12/2007 | Kawasaki et al. |
| 7,435,276 B2 | 10/2008 | Chen et al. |
| 7,556,558 B2 | 7/2009 | Palmgren |
| 7,704,127 B2 | 4/2010 | Taniguchi et al. |
| 7,926,478 B2 | 4/2011 | Nakai et al. |
| 8,037,878 B2 | 10/2011 | Kitagawa et al. |
| 8,206,472 B2 | 6/2012 | Tani et al. |
| 8,257,572 B2 | 9/2012 | Castro et al. |
| 8,291,895 B2 | 10/2012 | Sudarshan et al. |
| 8,425,640 B2 | 4/2013 | Liebelt et al. |
| 8,677,986 B2 | 3/2014 | Kazahaya et al. |
| 8,707,944 B2 | 4/2014 | Morita et al. |
| 8,720,429 B2 | 5/2014 | Lange et al. |
| 8,802,602 B2 | 8/2014 | Schmitjes et al. |
| 2001/0025457 A1 | 10/2001 | Tselesin |
| 2002/0010068 A1 | 1/2002 | Komatsu |
| 2002/0077054 A1 | 6/2002 | Sung |
| 2003/0084894 A1 | 5/2003 | Sung |
| 2003/0140914 A1 | 7/2003 | Lukschandel et al. |
| 2004/0107648 A1 | 6/2004 | Sung |
| 2004/0112359 A1 | 6/2004 | Sung |
| 2004/0244789 A1 | 12/2004 | Jentgens |
| 2005/0018642 A1 | 1/2005 | Nakamura |
| 2005/0103320 A1 | 5/2005 | Ebner |
| 2006/0016127 A1 | 1/2006 | Sung |
| 2006/0194038 A1 | 8/2006 | You et al. |
| 2006/0258268 A1 | 11/2006 | Miyata et al. |
| 2007/0023027 A1 | 2/2007 | Nakai et al. |
| 2007/0051354 A1 | 3/2007 | Sung |
| 2007/0051355 A1 | 3/2007 | Sung |
| 2007/0151554 A1 | 7/2007 | Song et al. |
| 2007/0261690 A1 | 11/2007 | Jentgens |
| 2007/0283944 A1 | 12/2007 | Hukin |
| 2008/0053000 A1 | 3/2008 | Palmgren et al. |
| 2008/0141593 A1 | 6/2008 | Bhatia |
| 2008/0141914 A1 | 6/2008 | Skovgaard-Soerensen et al. |
| 2008/0206576 A1 | 8/2008 | Qian et al. |
| 2008/0212733 A1 | 9/2008 | Pop et al. |
| 2008/0261499 A1* | 10/2008 | Tani et al. ..................... 451/528 |
| 2008/0271783 A1 | 11/2008 | Murakami et al. |
| 2009/0064983 A1 | 3/2009 | Sudarshan et al. |
| 2009/0120422 A1 | 5/2009 | Taniguchi |
| 2009/0202781 A1 | 8/2009 | Hall et al. |
| 2009/0242410 A1 | 10/2009 | Castro et al. |
| 2009/0283089 A1 | 11/2009 | Sung |
| 2010/0197202 A1 | 8/2010 | Branagan et al. |
| 2011/0009039 A1 | 1/2011 | Balagani et al. |
| 2011/0039070 A1 | 2/2011 | Liebelt et al. |
| 2011/0045292 A1 | 2/2011 | Tian et al. |
| 2011/0263187 A1 | 10/2011 | Liu et al. |
| 2011/0308371 A1 | 12/2011 | Morita et al. |
| 2012/0037140 A1 | 2/2012 | Campos et al. |
| 2012/0055097 A1 | 3/2012 | Tian et al. |
| 2012/0167482 A1 | 7/2012 | Tian et al. |
| 2013/0000211 A1 | 1/2013 | Upadhyay et al. |
| 2013/0032129 A1 | 2/2013 | Otani et al. |
| 2013/0061535 A1 | 3/2013 | Tian et al. |
| 2013/0084786 A1 | 4/2013 | Rehrig et al. |
| 2013/0092143 A1 | 4/2013 | Sudarshan et al. |
| 2013/0205676 A1 | 8/2013 | Tian et al. |
| 2013/0219801 A1 | 8/2013 | Liebelt et al. |
| 2014/0007513 A1 | 1/2014 | Rehrig et al. |
| 2014/0011434 A1 | 1/2014 | Puzemis et al. |
| 2014/0013675 A1 | 1/2014 | Tian et al. |
| 2014/0017984 A1 | 1/2014 | Rehrig et al. |
| 2014/0017985 A1 | 1/2014 | Tian et al. |
| 2014/0150766 A1 | 6/2014 | Che et al. |
| 2014/0311472 A1 | 10/2014 | Tian et al. |

FOREIGN PATENT DOCUMENTS

| | | |
|---|---|---|
| CN | 1488480 A | 4/2004 |
| CN | 1583336 A | 2/2005 |
| CN | 1721113 A | 1/2006 |
| CN | 1739927 A | 3/2006 |
| CN | 101066614 A | 11/2007 |

(56) References Cited

FOREIGN PATENT DOCUMENTS

| | | |
|---|---|---|
| CN | 201283606 Y | 8/2009 |
| CN | 101564828 A | 10/2009 |
| CN | 101712135 A | 5/2010 |
| DE | 10-2004-043718 A1 | 3/2006 |
| EP | 0237784 B1 | 6/1991 |
| EP | 0808701 A3 | 4/1998 |
| EP | 0916449 B1 | 9/1998 |
| EP | 0808701 B1 | 12/2002 |
| EP | 1371438 A1 | 12/2003 |
| EP | 1475463 B1 | 11/2004 |
| EP | 1685934 A | 8/2006 |
| EP | 2497602 A1 | 9/2012 |
| GB | 876605 | 9/1961 |
| GB | 962357 | 7/1964 |
| GB | 1254365 | 11/1971 |
| GB | 1342359 | 1/1974 |
| JP | 61-71949 A | 4/1986 |
| JP | 63102868 A | 5/1988 |
| JP | 30-79264 A | 4/1991 |
| JP | 5016066 | 1/1993 |
| JP | 5016066 A | 1/1993 |
| JP | H07-096454 A | 4/1995 |
| JP | H08-126953 A | 5/1996 |
| JP | H09-150314 A | 6/1997 |
| JP | H09-155631 A | 6/1997 |
| JP | H09-254006 | 9/1997 |
| JP | 10-034544 A | 2/1998 |
| JP | 10-118938 A | 5/1998 |
| JP | 10-256581 A | 9/1998 |
| JP | 10328932 | 12/1998 |
| JP | 11-216657 A | 8/1999 |
| JP | H11-216658 A | 8/1999 |
| JP | 11-277398 A | 10/1999 |
| JP | 2957571 | 10/1999 |
| JP | 11-320379 A | 11/1999 |
| JP | 11-347911 A | 12/1999 |
| JP | 2000-052226 | 2/2000 |
| JP | 2000052226 A | 2/2000 |
| JP | 2000-071162 A | 3/2000 |
| JP | 2000071160 | 3/2000 |
| JP | 2000-094297 A | 4/2000 |
| JP | 2000158318 A | 6/2000 |
| JP | 2000158319 A | 6/2000 |
| JP | 2000218504 | 8/2000 |
| JP | 2000-246654 A | 9/2000 |
| JP | 2000246542 A | 9/2000 |
| JP | 2000263452 A | 9/2000 |
| JP | 3103807 | 10/2000 |
| JP | 3104553 B2 | 10/2000 |
| JP | 2000271872 A | 10/2000 |
| JP | 2000288902 A | 10/2000 |
| JP | 2001054850 A | 2/2001 |
| JP | 2001-113519 A | 4/2001 |
| JP | 2001105295 | 4/2001 |
| JP | 2001259993 A | 9/2001 |
| JP | 2001277092 A | 10/2001 |
| JP | 2001287146 | 10/2001 |
| JP | 2001-341076 A1 | 12/2001 |
| JP | 2002-205272 A | 7/2002 |
| JP | 2002-254327 A | 9/2002 |
| JP | 2002254286 | 9/2002 |
| JP | 2002273663 A | 9/2002 |
| JP | 2002326151 | 11/2002 |
| JP | 2002331466 | 11/2002 |
| JP | 2002361566 A | 12/2002 |
| JP | 2003231063 A | 8/2003 |
| JP | 2003275970 A | 9/2003 |
| JP | 2003291057 A | 10/2003 |
| JP | 2004-009239 A | 1/2004 |
| JP | 2004050318 A | 2/2004 |
| JP | 2004174680 A | 6/2004 |
| JP | 2004209573 A | 7/2004 |
| JP | 2004216553 A | 8/2004 |
| JP | 2004-261889 A | 9/2004 |
| JP | 2004338023 A | 12/2004 |
| JP | 200507221 A | 1/2005 |
| JP | 2005238377 A | 9/2005 |
| JP | 2006007387 A | 1/2006 |
| JP | 3777285 | 5/2006 |
| JP | 2006123024 A | 5/2006 |
| JP | 2006123055 A | 5/2006 |
| JP | 2006130636 A | 5/2006 |
| JP | 2006150505 A | 6/2006 |
| JP | 2006-181701 A | 7/2006 |
| JP | 2006179677 | 7/2006 |
| JP | 2006181698 A | 7/2006 |
| JP | 2006231479 A | 9/2006 |
| JP | 2006272499 A | 10/2006 |
| JP | 2006297847 A | 11/2006 |
| JP | 2007021677 A | 2/2007 |
| JP | 2007044870 A | 2/2007 |
| JP | 2007061976 A | 3/2007 |
| JP | 2007-152485 A | 6/2007 |
| JP | 2007152486 | 6/2007 |
| JP | 2007196312 A | 8/2007 |
| JP | 2007196329 A | 8/2007 |
| JP | 2007203393 A | 8/2007 |
| JP | 2007203417 A | 8/2007 |
| JP | 2007237628 A | 9/2007 |
| JP | 2007253268 A | 10/2007 |
| JP | 2007268627 A | 10/2007 |
| JP | 2007281176 A | 10/2007 |
| JP | 2007307261 A | 11/2007 |
| JP | 4030964 B2 | 1/2008 |
| JP | 2008068332 A | 3/2008 |
| JP | 2008221406 A | 9/2008 |
| JP | 2010-000583 A | 1/2010 |
| JP | 2010-000584 A | 1/2010 |
| JP | 2010-284754 A | 12/2010 |
| JP | 2011-161613 A | 8/2011 |
| KR | 20000033534 A | 6/2000 |
| KR | 20010055980 A | 7/2001 |
| KR | 1020060006856 A | 1/2006 |
| RU | 83210 U1 | 5/2009 |
| TW | 442370 B | 6/2001 |
| TW | I291389 B | 12/2007 |
| WO | 9805466 A1 | 2/1998 |
| WO | 99/46077 A2 | 9/1999 |
| WO | 00/61324 A2 | 10/2000 |
| WO | 2004069479 A1 | 8/2004 |
| WO | 2005/064677 A1 | 7/2005 |
| WO | 2006070534 | 7/2006 |
| WO | 2006083688 A1 | 8/2006 |
| WO | 2007039934 A1 | 4/2007 |
| WO | 2008000072 A1 | 1/2008 |
| WO | 2009/064345 A2 | 5/2009 |
| WO | 2009/158507 A2 | 12/2009 |
| WO | 2010071198 | 6/2010 |
| WO | 2010/125085 A1 | 11/2010 |
| WO | 2010125085 A1 | 11/2010 |
| WO | 2011/020105 A2 | 2/2011 |
| WO | 2011/020109 A2 | 2/2011 |
| WO | 2011055692 | 5/2011 |
| WO | 2011055692 A1 | 5/2011 |
| WO | 2012/092614 A2 | 7/2012 |
| WO | 2013/040423 A2 | 3/2013 |
| WO | 2013/049204 A2 | 4/2013 |
| WO | 2013/147892 A1 | 10/2013 |
| WO | 2014/004982 A1 | 1/2014 |
| WO | 2014/004991 A1 | 1/2014 |
| WO | 2014/005009 A1 | 1/2014 |
| WO | 2014/005015 A1 | 1/2014 |
| WO | 2014/005028 A1 | 1/2014 |
| WO | 2014/005037 A1 | 1/2014 |

OTHER PUBLICATIONS

Enomoto, Toshiyuki et al. "Development of a Resinoid Diamond Wire Containing Metal Powder for Slicing a Slicing Ingot." Annals of the CIRP. 32.1 (1983): 273-276.
Fujisawa, M. et al. "Precision Sawing with Wire Saw." Annals of the CIRP. 32.1 (1983): 87-90.
U.S. Appl. No. 12/857,378, filed Aug. 16, 2010, Inventor: Susanne Liebelt.

(56) References Cited

OTHER PUBLICATIONS

Daisuke Ide, "Resin Bond Diamond wire for slicing ceramics", Industrial Diamond Review vol. 2/2007, pp. 32-34.

Osamu Kamiya et al., "Diamond and metal bonding by active solder for micro-cutting wire", Int. J. of Modern Physics B, vol. 20, Nos. 25-27 (2006) pp. 3932-3937.

Jun Sugawara et al., "Development of fixed abrasive-grain wire saw with less cutting loss" SEI Technical Review No. 58, Jun. 2004, pp. 7-11.

Y. Chiba et al., "Development of a high-speed manufacturing method for electroplated diamond wire tools", Annals of the CIRP vol. 52/1/2003, pp. 281-284.

Conversion US mesh (tamis)—microns: http://www.granuloshop.com/Conversion.htm (Sep. 2, 2003).

International Search Report for PCT/US2010/045647 mailed Apr. 29, 2011.

International Search Report for PCT/US2010/045643 mailed Apr. 29, 2011.

International Search Report for PCT/US2012/031699 mailed Nov. 16, 2012.

International Search Report for PCT/US2011/068240 mailed Aug. 27, 2012.

U.S. Appl. No. 13/930,577, filed Jun. 28, 2013.

U.S. Appl. No. 61/813,815, filed Apr. 19, 2013.

U.S. Appl. No. 61/813,833, filed Apr. 19, 2013.

International Search Report for PCT/US2012/055529 mailed Feb. 21, 2013.

International Search Report for PCT/US2012/057334 mailed Mar. 28, 2013.

International Search Report for PCT/US2013/048587 mailed Sep. 17, 2013.

International Search Report for PCT/US2013/048565 mailed Aug. 27, 2013.

International Search Report for PCT/US2013/048549 mailed Sep. 11, 2013.

International Search Report for PCT/US2013/048491 mailed Aug. 26, 2013.

International Search Report for PCT/US2013/048511 mailed Aug. 27, 2013.

International Search Report for PCT/US2013/048609 mailed Sep. 2, 2013.

Nakamura Choko Co., Ltd., "Company Report", Mar. 31, 2010, 10 pages.

Higashi, Taisuke et al., Development of Low Melting Temperature Coating Materials for High Performance Diamonds Wire Saw: Effect of an Additive on Mechanical Properties.

Patel, Mitesh M., "Characterizing Fatigue and Fracture Response of Medical Grade Nickel-Titanium Alloys by Rotary Beam Testing," Presented at the ASTM Symposium on Fatigue and Fracture of Medical Metallic Materials and Devices, Dallas, Texas, Nov. 2005, 12 pages.

International Search Report for PCT/US2014/034611 mailed Aug. 28, 2014.

Copper and Copper Alloys Jan. 1, 2001 (exerpt)—Davis, ASM International; pp. 127-130.

International Search Report for International Application No. PCT/JP2010/069294 dated Nov. 22, 2010.

\* cited by examiner

ABRASIVE ARTICLES INCLUDING ABRASIVE PARTICLES BONDED TO AN ELONGATED BODY, AND METHODS OF FORMING THEREOF

CROSS-REFERENCE TO RELATED APPLICATION(S)

The present application claims priority from U.S. Provisional Patent Application No. 61/234,205, filed Aug. 14, 2009, entitled "Abrasive Articles Including Abrasive Particles Bonded To An Elongated Body, and Methods of Forming Thereof," naming inventors Yinggang Tian, Ran Ding, Susanne Liebelt, Krishnamoorthy Subramanian, which application is incorporated by reference herein in its entirety.

BACKGROUND

1. Field of the Disclosure

The following is directed to abrasive articles, and particularly abrasive articles including abrasive grains secured to an elongated body.

2. Description of the Related Art

A variety of abrasive tools have been developed over the past century for various industries for the general function of removing material from a workpiece, including for example sawing, drilling, polishing, cleaning, carving, and grinding. In particular respect to the electronics industry, abrasive tools suitable for slicing single crystal ingots of material to form wafers, such as silicon wafers is particularly pertinent. As the industry continues to mature, the ingots have increasingly larger diameters, and it has become acceptable to use loose abrasives and wire saws for such works due to yield, productivity, affected layers, dimensional constraints and the like factors.

Wire saws include abrasive tools that include abrasive particles attached to a long length of wire that can be spooled at high speeds to produce a cutting action. While circular saws, and the like, are limited to a cutting depth of less than the radius of the blade, wire saws can have greater flexibility allowing for cutting of straight or profiled cutting paths.

Certain conventional wire saws are produced by sliding steel beads over a metal wire or cable, wherein the beads are typically separated by spacers and the beads are covered by abrasive particles which are commonly attached by either electroplating or sintering. However, electroplating and sintering operations can be time consuming and thus costly ventures, prohibiting rapid production of the wire saw abrasive tool. Some attempts have been made to attach abrasive particles via chemical bonding processes, such as brazing, but such fabrication methods reduce the flexibility of the wire saw, and the braze coating becomes susceptible to fatigue and premature failure. Other wire saws may use a resin to bind the abrasives to the wire. Unfortunately, the resin bonded wire saws tend to wear quickly and the abrasives are lost well before the useful life of the particles is realized.

Accordingly, the industry continues to need improved wire saw abrasive tools and method of forming such tools.

SUMMARY

According to one aspect, an abrasive article comprises an elongated body, a bonding layer including a metal overlying a surface of the elongated body a coating layer comprising a polymer material overlying the boding layer; and abrasive grains contained within the bonding layer and coating layer. The bonding layer has an average thickness ($t_{bl}$) at least about 40% of the average grit size of the abrasive grains.

According to another aspect, an abrasive article includes an elongated body, a bonding layer including a metal overlying a surface of the elongated body, and a coating layer made of a polymer material overlying the boding layer. The coating layer has an average thickness ($t_c$) less than an average thickness of the bonding layer ($t_{bl}$), and abrasive grains are contained within the bonding layer and coating layer. The abrasive grains are embedded within the bonding layer at an average indentation depth ($d_i$) of at least about 40% of an average grit size of the abrasive grains.

In yet another aspect, an abrasive article includes an elongated body, a bonding layer made of a metal overlying a surface of the elongated body, a coating layer comprising a polymer material overlying the boding layer, wherein the coating layer comprises an average thickness ($t_c$) less than an average thickness of the bonding layer ($t_{bl}$), and abrasive grains contained within the bonding layer and coating layer. A minor amount of the total amount of abrasive grains are contained within the bonding layer and spaced away from the surface of the elongated body.

Another aspect is directed to an abrasive article including an elongated body, a bonding layer including a metal overlying a surface of the elongated body, and a coating layer having a polymer material overlying the bonding layer. The coating layer comprises an average thickness ($t_c$) less than an average thickness of the bonding layer ($t_{bl}$) and abrasive grains contained within the bonding layer and coating layer.

According to another aspect, an abrasive article includes an elongated body, a bonding layer comprising a metal overlying a surface of the elongated body, and a coating layer comprising a polymer material overlying the bonding layer. The article further includes abrasive grains contained within the bonding layer, wherein a portion of the coating includes wetted regions selectively surrounding a portion of the abrasive grains and unwetted regions between a portion of the abrasive grains, the wetted regions having an average thickness of the coating layer that is greater than an average thickness of the coating layer in the unwetted regions.

In still another aspect, a method of forming an abrasive article includes forming a bonding layer comprising a metal on a surface of an elongated body, embedding abrasive grains within the bonding layer, and forming a coating layer comprising a polymer overlying the bonding layer after embedding the abrasive grains within the bonding layer.

Other aspects are directed to a method of forming an abrasive article including forming a bonding layer comprising a metal on a surface of an elongated body, a coating layer comprising a polymer overlying the bonding layer, and abrasive grains embedded within the bonding layer and coating layer. The forming process is completed at a rate of at least about 1 km/hr.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following is generally directed to abrasive articles incorporating an elongated body to which abrasive grains are secured. In particular, the abrasive articles are suitable for processes using long lengths of abrasive articles, which can include for example wire sawing applications, commonly employed in the electronics industry to segment boules of single crystal material. However, it will be appreciated that such abrasive articles as disclosed herein can be used for other abrasive processes.

Figure 1:
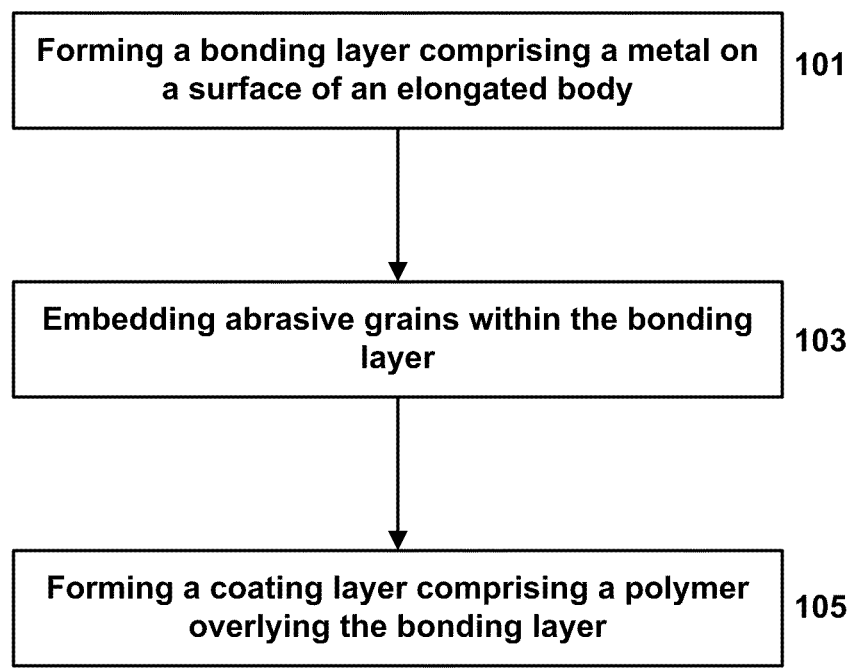
FIG. 1 includes a flowchart illustrating a method of forming an abrasive article in accordance with an embodiment.

FIG. 1 includes a flowchart providing a method of forming an abrasive article in accordance with an embodiment. The forming process can be initiated at step 101 by forming a bonding layer comprising a metal on a surface of an elongated body. The elongated body can be made of various materials, including for example, inorganic materials, organic materials, and a combination thereof. Suitable inorganic materials can include ceramics, glasses, metals, metal alloys, cermets, and a combination thereof. In certain instances, the elongated body includes a metal or metal alloy material. For example, the elongated body can be made of a transition metal or transition metal alloy material such that it can incorporate elements of iron, nickel, cobalt, copper, chromium, molybdenum, vanadium, tantalum, tungsten, and the like. In some instances, the elongated body may be a braided structure incorporating a plurality of elongated strands woven together and secured to each other to form an elongated body.

Suitable organic materials can include polymers, which can include thermoplastics, thermosets, elastomers, and a combination thereof. Particularly useful polymers can include polyimides, polyamides, resins, polyurethanes, polyesters, and the like. It will further be appreciated that the elongated body can include natural organic materials, for example, rubber.

The elongated body can have a length defined by a dimension extending along the longitudinal axis of the elongated body. The elongated body can have a particular shape such that it is suitable for use in abrasive processing. For example, the elongated body can have a generally cylindrical shape such that it has a circular cross-sectional contour as viewed in a plane extending transversely to the longitudinal axis of the elongated body. In using elongated bodies having a circular cross-sectional shape, the average diameter can be at least about 10 microns. Some designs may incorporate thicker elongated body members such that the average diameter can be at least about 25 microns, at least about 40 microns, at least about 50 microns, or even at least about 100 microns. Particular designs may utilize an elongated body having an average diameter within a range between about 25 microns and about 400 microns, such as between about 50 microns and about 400 microns.

In other designs, the elongated body can have a polygonal cross-sectional contour as viewed in a plane extending transversely to the longitudinal axis of the elongated body. The polygonal cross-sectional contour can include various multi-sided shapes, including in particular, rectangular shapes, pentagonal, hexagonal, and the like. In one particular instance, the elongated body can have a rectangular shape, wherein the elongated body is a belt having a first major surface, a second major surface opposite the first major surface and a side surface extending between the first and second major surfaces.

The side surface of the belt can define a thickness of the elongated body, while the first major surface can define a width of the elongated body as measured in a direction transverse to the longitudinal axis. In particular instances, the elongated body can have a thickness:width ratio of at least about 1:2. In other embodiments, the elongated body can have a thickness:width ratio of at least about 1:3, such as at least about 1:4, at least about 1:5, at least about 1:10, at least about 1:50. Still, particular embodiments can have a thickness:width ratio within a range between about 1:2 and 1:150, such as between about 1:2 and about 1:100.

For abrasive applications, it may be suitable that the elongated body have a sufficient length. For example, the elongated body can have a length as measured along the longitudinal axis of the elongated body of at least about 1 km. In other instances, this length can be greater, such as on the order of at least about 5 km, at least about 10 km, and particularly within a range between about 1 km and about 100 km. Still, it will be appreciated that smaller lengths can be fabricated for particular applications, such that the elongated body can have a length within a range between about 50 m and 1 km, such as between 50 m and 750 m.

The bonding layer can be formed such that it overlies an upper surface of the elongated body to facilitate the bonding and securing of abrasive grains therein to form the final-formed abrasive article. In particular instances, the bonding layer is directly contacting the upper surface of the elongated body such that it is directly bonded to the upper surface of the elongated body. Still, in certain abrasive articles, an intervening layer of material may be disposed between the bonding layer and upper surface of the elongated body. Such intervening layers can be present to aid bonding between the elongated body and the bonding layer. Moreover, the bonding layer can be formed such that it covers essentially the entire upper surface of the elongated body. Suitable methods for forming the bonding layer on the elongated body can include deposition processes. For instance, the bonding layer can be deposited on the external surface of the elongated body by a plating process, such as an electroplating process.

Figure 2:
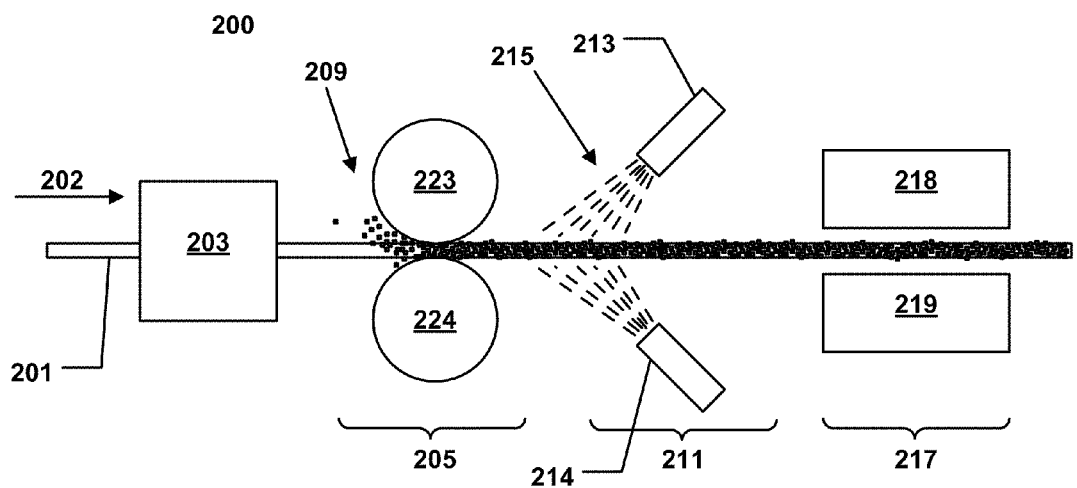
FIG. 2 includes a schematic of a method of forming an abrasive article in accordance with an embodiment.

Referring briefly to FIG. 2, a schematic of a method of forming an abrasive article in accordance with an embodiment is provided. FIG. 2 includes a system 200 and a wire 201 that can be translated in the direction 202 through the system for forming the abrasive articles according to embodiments herein. The system 200 includes a plating machine 203 for depositing the bonding layer material on the wire 201. The wire 201 can be translated through the plating machine 203, wherein the bonding layer material can be deposited on the upper surface of the elongated body.

Suitable materials for forming the bonding layer can include metals or metal alloys. Some suitable metal species can include copper, nickel, tungsten, tin, molybdenum, iron, cobalt, and the like, which may particularly include transition metal elements. For example, the bonding layer can include copper, and in fact, the bonding layer material can be made entirely of copper. Other bonding layers can use an alloy, such as a copper-based metal alloy material, for example, the bonding layer can be a metal alloy comprising copper and zinc. In copper-based metal bonding layers, alloying metals, such as nickel, tungsten, tin, and other metal elements may be added in minor amounts as compared to the content of copper to form a copper-based metal alloy.

Referring again to FIG. 1, after forming a bonding layer on the elongated body at step 101, the process can continue at step 103 by embedding abrasive grains within the bonding layer. The process of embedding abrasive grains within the bonding layer can be completed such that the abrasive grains are secured to the wire to form a suitable abrasive article. Notably, the process of embedding the abrasive grains into the bonding layer can be a separate step, particularly separated from other processes for forming constituent layers. Accordingly, certain features such as the position of the abrasive grains along the length of the abrasive article, the orientation of each of the abrasive grains within the abrasive article, and average indentation depth of the abrasive grains in the bonding layer, may be controlled for improved abrasive characteristics in the final-formed abrasive article.

Referring again to FIG. 2, in accordance with one embodiment, the process of embedding abrasive grains within the bonding layer can include a pressing process wherein the abrasive grains are pressed into the bonding layer material. At region 205 of FIG. 2, abrasive grains 209 can be provided proximate to the wire 201 that can be passed between two rollers 223 and 224 such that the abrasive grains 209 can be pressed into the bonding layer between the rollers 223 and 224 while the wire 201 passes therethrough. It will be appreciated, that the abrasive grains 209 can be positioned relative to the wire 201 and rollers 223 and 224 in a variety of manners. For example, the abrasive grains 209 may be provided on the surface of the rollers 223 and 224, and as the wire 201 passes between the rollers 223 and 224 a fraction of the abrasive grains 209 on the surface of the rollers 223 and 224 are embedded within the bonding layer. In this system, a manner for continuously covering the surface of the rollers 223 and 224 in abrasive grains 209 can be undertaken. In other pressing processes, the abrasive grains 209 may be injected into the region between the two rollers 223 and 224 proximate to the wire 201 of the abrasive article, such that abrasive grains 209 can be captured between the rollers 223 and 224 can be pressed and embedded within the bonding layer.

The materials of the abrasive grains 209 can be such that they are particularly hard and suitable for use in an abrasive processing. That is, the abrasive grains 209 can have a Mohs hardness of at least about 7, such as at least 8, and more typically on the order of at least about 9. The abrasive grains may include materials such as carbides, carbon-based materials (e.g. fullerenes), nitrides, oxides, borides, and a combination thereof. In certain instances, the abrasive grains 209 can be superabrasive grains. For example, diamond (natural or synthetic), cubic boron nitride, and a combination thereof. In one particular embodiment, the abrasive grains consist essentially of diamond.

The average grit size of the abrasive grains 209 can be altered depending upon the application. Additionally, the size distribution of the average grit size of the abrasive grains 209 can be altered depending upon the intended application. For example, the abrasive articles herein may be particularly suitable for use in the electronics industry such as slicing polysilicon ingots or boules into wafers for photovoltaic devices. Use of the abrasive article in such applications may warrant the use of abrasive grains 209 having an average grit size of less than about 200 microns. In fact, the average grit size may be less than about 150 microns, such as about less than about 100 microns, less than about 75 microns, less than about 50 microns, or even less than about 25 microns. Still, in particular instances the average grit size can be at least about 10 microns, at least 50 microns, and particularly within a range between about 10 microns and about 200 microns.

For other applications, such as industrial applications, the average grit size of the abrasive grains 209 can be larger. For example, the average grit size can be at least about 200 microns, at least about 300 microns, or even at least 400 microns, and particularly between about 200 microns and about 500 microns.

Additionally, depending upon the application, the percentage of the external surface area of the final-formed abrasive article that is covered by the abrasive grains 209 can be controlled. Generally, the abrasive grains 209 cover between about 1% to about 100%, such as between about 1% to about 80%, between about 1% to about 75%, between about 1% to about 60%, between about 1% to about 50%, between about 1% to about 40%, between about 1% to about 30%, between about 1% to about 20% of the total available external surface area of the abrasive article.

Referring again to FIG. 1, after embedding the abrasive grains within the bonding layer at step 103, the process continues at step 105 by forming a coating layer comprising a polymer overlying the bonding layer to provide additional mechanical support for securing the abrasive grains. The coating layer can be provided in a manner such that it overlies the bonding layer and a portion of the abrasive grains 209. In more particular instances, the coating layer can be provided such that it is directly bonded to the upper surface of the bonding layer and the exposed surfaces of the abrasive grains 209 extending above the bonding layer. In some designs, the coating layer is provided in a manner to form a uniform and continuous coating over the external surface area of the bonding layer and abrasive grains. Still, as will be described in other embodiments, the coating layer can be provided in a selective manner such that wetted regions and unwetted regions are formed on the upper surface of the bonding layer.

Referring to FIG. 2, within region 211, the coating layer can be applied to the preformed abrasive article comprising the abrasive grains 209 secured within the bonding layer overlying the wire 201. The method of applying the coating layer can include a deposition process, such that for example, the polymer material 215 of the coating layer can be applied via a spray coating method. In particular, the spray coating process can include the use of spray nozzles 213 and 214 directed at the abrasive article and intended to expel the polymer material from the spray heads at a controlled, average volume rate of at least about 1 cc/min., or on the order of at least about 2 cc/min., at least about 5 cc/min., 8 cc/min., 10 cc/min., or even at least about 12 cc/min., for certain processes utilizing spray nozzles of a certain size. In such instances, the average volume rate of polymer material expelled from the spray nozzles 213 and 214 can be within a range between about 1 cc/min. and 15 cc/min., such as between about 1 cc/min. and 10 cc/min, or even between about 1 cc/min. and 8 cc/min.

Still, in other processes, higher average volume flow rates have been utilized with other spray nozzles. For example, average volume flow rates of at least about 15 cc/min., such as at least about 20 cc/min., at least about 25 cc/min., at least about 30 cc/min., or even at least about 40 cc/min. have been utilized. According to the embodiments of such processes, the spray coating process is conducted such that the polymer material is sprayed at an average volume rate of between about 10 cc/min. and 75 cc/min., such as between about 15 cc/min. and 50 cc/min, or even between about 20 cc/min. and 40 cc/min.

In utilizing a spray coating process, the spray heads 213 and 214 may be oriented at particular angles relative to the longitudinal axis of the wire 201, such that control of the coating is feasible. For instance, the velocity at which the polymer material 215 is expelled and the angle at which the spray heads 213 and 214 are oriented may be altered to adjust the thickness and uniformity of the coating layer.

Additionally, the polymer material 215 can be heated during the spray coating process to facilitate application. For example, the polymer material 215 may be heated to a temperature of at least about 30° C., such as at least about 50° C. and particularly within a range between about 30° C. and about 100° C.

Notably, a polymer material 215 that is essentially free of a solvent material may be used for the coating process. The application of a solvent-free polymer material 215 may facilitate improved control of the coating layer uniformity, reduction of bubbles, and a more efficient forming process, since volatilization of a solvent material may not be a concern. Moreover, in such processes wherein the polymer material 215 is free of a solvent, concerns of shrinkage and reduction of the coating layer thickness during curing may be mitigated.

In particular instances, the polymer material 215, which will be understood to also include oligomer materials, can include certain materials, such as thermoplastics and/or thermosets. By way of example, the polymer may include monomers, oligomers, and resins for the formation of polyurethane, polyurea, polymerized epoxy, polyester, polyimide, polysiloxanes (silicones), polymerized alkyd, or, in general, reactive resins for the production of thermoset polymers. Another example includes an acrylate or a methacrylate polymer. The polymer material 215 can be a curable organic material (i.e., a polymer monomer or material capable of polymerizing or crosslinking upon exposure to heat or other sources of energy, such as electron beam, ultraviolet light, visible light, etc., or with time upon the addition of a chemical catalyst, moisture, or other agent which cause the polymer to cure or polymerize).

In addition to the coating process, after application of the coating layer, the formation of the coating layer can include a curing process such that the polymer material 215 is hardened and forms a suitable coating layer. The curing process can be conducted at region 217 wherein the abrasive article can be translated through curing structures 218 and 219. The curing structures 218 and 219 may provide heat, radiation, or a combination thereof to facilitate the curing process. In accordance with one embodiment, the curing process includes the application of electromagnetic radiation of a particular wavelength (e.g., UV wavelengths) to the polymer material 215 to facilitate the curing process.

It will be appreciated that the formation of the coating layer is a process that can be separate and distinct from other process steps, such as the forming of the bonding layer or embedding of abrasive grains. The coating layer can be formed in a controlled manner such that the exposure of the abrasive grains in the final formed device can be altered. For example, in certain abrasive articles, the coating layer may be formed such that it coats the abrasive grains, such that a majority of the abrasive grains are buried beneath the upper surface of the coating layer. In other embodiments, the abrasive article can be formed such that a majority of the abrasive grains are exposed and protrude from the upper surface of the coating layer. That is, embodiments herein can have a certain abrasive grain exposure as measured as the greatest distance above upper surface of the bonding layer that an abrasive grain extends. The abrasive grain exposure can be averaged for a sample of at least about 20 abrasive grains such that a representative number is generated for the abrasive article. As such, abrasive articles according to embodiments herein can have an abrasive grain exposure of between about 1% and about 95% of the average grit size of the abrasive grains.

The process illustrated in FIGS. 1 and 2 can be conducted in a manner such that the abrasive article is formed at an efficient rate. As opposed to certain other methods of forming abrasive wire articles, which may include time-consuming processes such as repetitive electrical plating processes or dip-coating processes for the application of polymers and abrasive grains, the following process can be conducted at a rate of at least about 1 km/hr to make the final-formed abrasive article. In other instances, the forming process may be quicker, such that the rate of forming is at least about 2 km/hr, such as at least about 3 km/hr, or even at least about 4 km/hr. Still, the forming process herein may be conducted at a rate within a range between about 1 km/hr and about 15 km/hr, such as between about 1 km/hr and about 10 km/hr, and more particularly between about 3 km/hr and about 8 km/hr.

Figure 3:
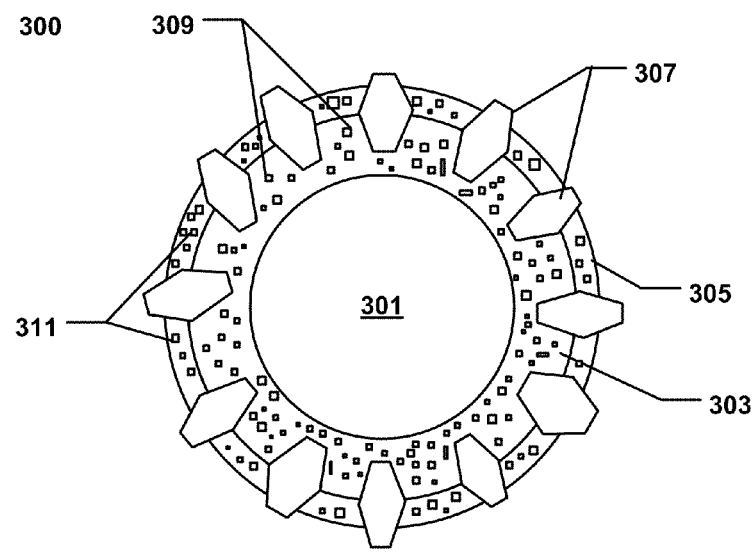
FIG. 3 includes a cross-sectional illustration of a portion of an abrasive article in accordance with an embodiment.

FIG. 3 includes a cross-sectional illustration of an abrasive article in accordance with an embodiment. As illustrated, the abrasive article 300 includes an elongated body 301, as a core article having a circular cross-sectional shape. Surrounding the elongated body 301 is a bonding layer 303 such that it substantially covers the upper surface 306 of the elongated body 301.

In certain optional designs, the bonding layer 303 can incorporate a filler 309 within the bonding layer 303. The filler 309 can include a particulate to improve the abrasive capabilities and wear characteristics of the bonding layer 303. However, the particulate of the filler 309 can be significantly different than the abrasive grains 307, particularly with regard to size, which can include for example, a filler 309 having an average grain size that is substantially less than the average grain size of the abrasive grains 307. That is, the particulate of the filler 309 can have an average grain size that is at least about 2 times less than the average grit size of the abrasive grains 307. In fact, the particulate may have an average grain size that is even smaller, such as on the order of at least 3 times less, such as at least about 5 times less, at least about 10 times less, at least about 100 times less, or even at least about 1000 times less. Certain abrasive articles may use a filler 309 including a particulate having an average grain size within a range between about 2 times and about 1000 times less, or between about 10 times to about 1000 times than the average grit size of the abrasive grains 307.

The particulate making up the filler 309 within the bonding layer 303 can be made from a material such as carbides, carbon-based materials (e.g. fullerenes), borides, nitrides, oxides, and a combination thereof. In particular instances, the particulate can be a superabrasive material such as diamond, cubic boron nitride, or a combination thereof. Accordingly, it will be appreciated that the particulate of the filler 309 can be the same material as that of the abrasive grains 307. In other instances, the particulate of the filler 309 can include a different material than the material of the abrasive grains 307.

According to other designs, the filler 309 can be made of a metal or metal alloy material. For example, the filler 309 can include particulate that comprises a metal. Suitable metal materials can include transition elements. Particular transition metal elements suitable for use in the particulate of the filler 309 can include copper, silver, iron, cobalt, nickel, zinc, molybdenum, chromium, niobium, and a combination thereof.

As further illustrated in FIG. 3, the abrasive article 300 includes a coating layer 305 overlying the external surface 311 of the bonding layer 303 and portions of the abrasive grains 307. As further illustrated, the coating layer 305 can include a coating filler material 311 contained within the matrix of the coating layer material 305, and may be placed within the coating layer 305 such that substantially all of the coating filler material 311 is surrounded by the coating layer material 305. Notably, the coating layer filler 311 can include particulate having the same features of the particulate of the filler material 309 within the bonding layer 303. Additionally, the filler 311 may be provided within the coating layer 305 for improved mechanical properties, such as improved elasticity, hardness, toughness, and wear resistance. In particular embodiments, the particulate making up the coating filler material 311 can be the same as the particulate of the filler material 309 within the bonding layer 303. Still, in other embodiments, the particulate of the coating filler material 311 can be different than the particulate of the filler material 309 of the bonding layer 303.

Figure 4:
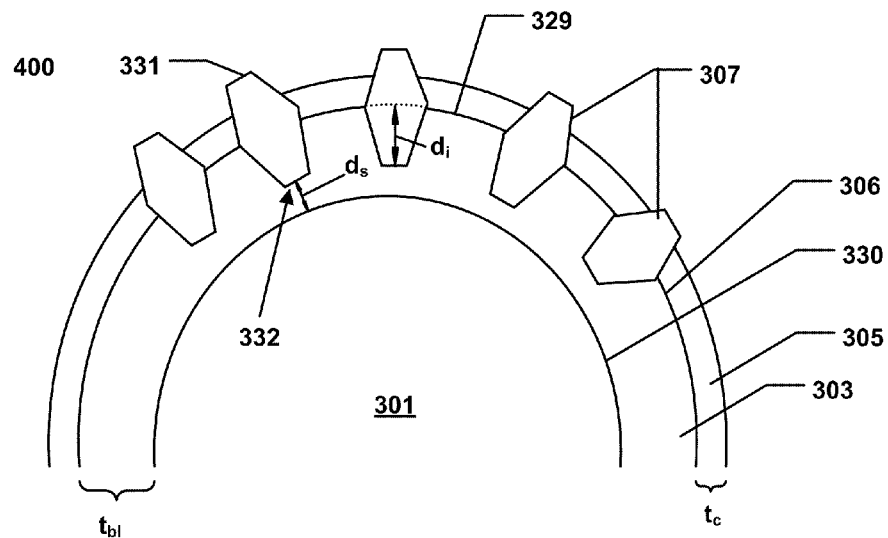
FIG. 4 includes a cross-sectional illustration of a portion of an abrasive article in accordance with an embodiment.

FIG. 4 includes a cross-sectional illustration of a portion of an abrasive article in accordance with an embodiment. As illustrated, the abrasive article 400 includes an elongated body 301, as a core structure having a circular cross-sectional shape and a bonding layer 303 overlying the upper surface 330 of the elongated body 301. Additionally, as illustrated, the abrasive article 400 includes a coating layer 305 overlying the bonding layer 303 and abrasive grains 307 contained within a portion of the bonding layer 303 and the coating layer 305.

In accordance with a particular embodiment, the bonding layer can be formed to have an average thickness ($t_{bl}$) with a certain relationship to the average grit size of the abrasive grains 307. For example, the bonding layer 303 can have an average thickness ($t_{bl}$) that is at least about 40% of the average grit size of the abrasive grains 307. In other embodiments, the average thickness ($t_{bl}$) of the bonding layer 303 is greater, such that it is at least about 50% of the average grit size, such as at least about 60%, or even at least about 80% of the average grit size of the abrasive grains 307. For certain abrasive articles, the bonding layer 303 can have an average thickness ($t_{bl}$) within a range between about 40% and about 120%, and more particularly within a range between about 50% and about 110%, or even between about 50% and 100% of the average grit size of the abrasive grains 307.

In further reference to the average thickness ($t_{bl}$), the bonding layer 303 can be formed such that it is has an average thickness of at least about 10 microns. In other cases, the bonding layer 303 can be more robust, having an average thickness on the order of at least about 15 microns, at least about 20 microns, or even at least about 25 microns. For example, the bonding layer 303 can have an average thickness within a range between about 10 microns and about 30 microns, such as within a range between about 15 microns and about 30 microns, or even more particularly within a range between about 20 microns and about 30 microns.

In further reference to the relationship between the bonding layer 303 and abrasive grains 307, the abrasive grains may be embedded within the bonding layer 303 at a particular average indentation depth ($d_i$) to control the abrasive characteristics of the final-formed abrasive article. The average indentation depth ($d_i$) is the average depth at which the abrasive grains 307 are secured within the bonding layer 303, measured as the distance between the upper surface 306 of the bonding layer 303 and the portion of the respective abrasive grain at the greatest distance from the upper surface 306 within the bonding layer 303 as illustrated in FIG. 4. In accordance with an embodiment, the abrasive grains 307 can be embedded within the bonding layer 303 at an average indentation depth ($d_i$) of at least 40% of the average grit size of the abrasive grains 307. In other abrasive articles, the abrasive grains 307 may be embedded to a greater degree within the bonding layer 303, such that the average indentation depth ($d_i$) is at least about 50%, such as at least about 60%, or even at least about 75% of the average grit size of the abrasive grains 307. Still, the abrasive article 400 can be formed such that the average indentation depth ($d_i$) can be within a range between about 50% and 90%, and more particularly within a range between about 50% and 80% of the average grit size of the abrasive grains 307.

As illustrated, in FIG. 4, a representative abrasive grain 331 is placed within the bonding layer 303 in a manner such that the bottom surface 332 of the abrasive grain 331, otherwise the surface of the abrasive grain 331 closest to the upper surface 330 of the elongated body 301, can be spaced away from the upper surface 330. The distance between the bottom surface 332 of the abrasive grain and the upper surface 330 of the elongated body 301 is a spacing distance ($d_s$). Notably, the spacing distance ($d_s$) can be at least about 2% of the average thickness of the bonding layer 303. In other embodiments, the spacing distance ($d_s$) can be greater, such that it is at least about 5%, at least about 10%, at least about 20%, at least about 30%, or even at least about 40% of the average thickness ($t_{bl}$) of the bonding layer 303. Particular abrasive articles can utilize a spacing distance ($d_s$) that is within a range between about 2% and 40%, such as between about 10% and about 35%, and more particularly within a range between about 15% and 30% of the average thickness ($t_{bl}$) of the bonding layer 303.

Certain abrasive articles can be formed such that a certain number of the abrasive grains are spaced away from the upper surface 330 of the elongated body. For example, a minor amount (less than 50%, but greater than 0%) of the total number of abrasive grains 307 within the abrasive article 400 can be spaced away from the upper surface 330 of the elongated body 301 by a spacing distance ($d_s$). Other abrasive articles can be formed such that a majority content (greater than 50%) of the total amount of abrasive grains 307 are spaced away at a spacing distance ($d_s$) from the upper surface 330 elongated body 301. For example, in certain embodiments it is suitable that at least about 80%, or at least about 85%, at least about 90%, or even essentially all of the abrasive grains are contained within the bonding layer 303 such that they are spaced away at a spacing distance ($d_s$) from the upper surface 330 of the elongated body 301.

As further illustrated in FIG. 4, the coating layer 305 can be formed such that it has an average thickness ($t_c$) to cover a proper proportion of the abrasive grains 307 within the bonding layer 305 to provide suitable abrasive characteristics in the final-formed abrasive article. In certain instances, the average thickness ($t_c$) is not greater than about 50% of the average grit size of the abrasive grains 307. For example, the coating layer 305 can have an average thickness that is not greater than about 40%, not greater than about 30%, or even not greater than about 20% of the average grit size of the abrasive grains 307. Still, the coating layer 305 can have an average thickness within a range between about 5% and 50%, and more particularly within a range between about 5% and 30% of the average grit size of the abrasive grains 307.

The coating layer 305 can be formed such that it has an average thickness ($t_c$) that is less than the average thickness ($t_{bl}$) of the bonding layer 303. For example, the average thickness of the coating layer 305 relative to the average thickness ($t_{bl}$) of the bonding layer 303 can be described as a layer ratio ($t_c$:$t_{bl}$). In certain instances, the layer ratio can be at least about 1:2. In other instances, the layer ratio can be at least about 1:3, such at least about 1:4, and can be particularly within a range between about 1:2 and about 1:5, or even between about 1:2 and about 1:4.

Certain abrasive articles herein may utilize a coating layer 305 having an average thickness ($t_c$) of not greater than about 25 microns. In other instances, the coating layer may be thinner, such that the average thickness ($t_c$) is not greater than about 20 microns, not greater than about 15 microns, such as on the order of not greater than about 10 microns, such as not greater than about 8 microns, not greater than about 5 microns, and particularly within a range between about 2 microns and 25 microns, between about 5 microns and about 20 microns, or even between about 5 microns and about 10 microns.

Reference herein to values, dimensions, average values, including for example, average thickness ($t_c$), average thickness ($t_c$), average thickness ($t_{bl}$), spacing distance ($d_s$), and the like, can be measured using enlarge photographs (e.g., SEM photographs) of the area of interest, typically viewed in cross-section of the abrasive article. Measurement techniques can include a diverse sampling from multiple locations along the length of the abrasive article coupled with multiple measurements at each location of the specified dimension to achieve precise results. For example, a suitable sampling size can include a sampling of at least 3-10 different locations and at least 10 measurements, at least 20 measurements, and more preferable at least 50 measurements in total to derive a suitable value for the identified dimension.

Figure 5:
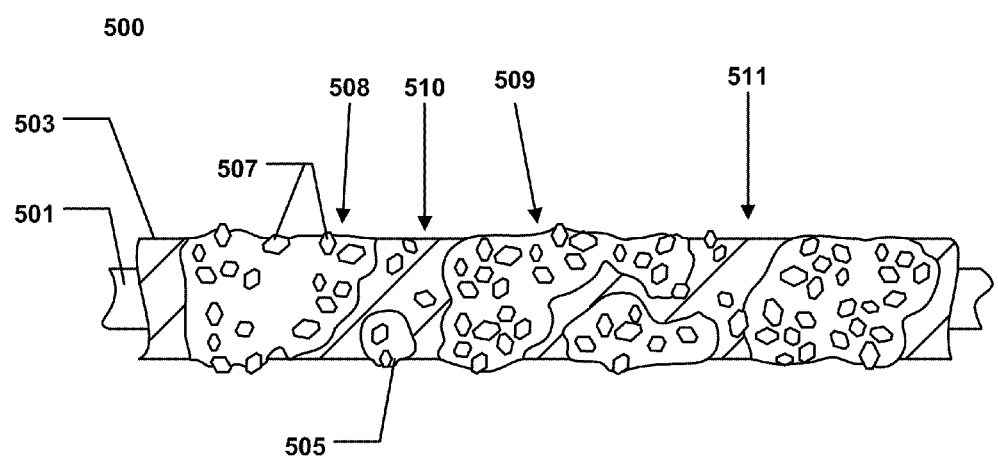
FIG. 5 includes a side view of a portion of an abrasive article in accordance with an embodiment.

FIG. 5 includes a side view of a portion of an abrasive article in accordance with an embodiment. In particular, the abrasive article 500 demonstrates an alternative abrasive article which may be formed according to the processes herein. Notably, the abrasive article includes an elongated body 501 that includes a bonding layer 503 overlying an upper surface of the elongated body 501. As illustrated, the bonding layer 503 is formed such that it substantially covers essentially the entire external surface of the upper surface of the elongated body 501.

The abrasive article 500 includes a selective coating layer 505, which forms wetted regions 508 and 509, and unwetted regions 510 and 511 extending between and separating the wetted regions 508 and 509. As illustrated, the wetted regions 508 and 509 are areas wherein the coating layer 505 covers the upper surface of the bonding layer 503 and defines regions having an average thickness of the coating layer 505 that is greater than the average thickness of the coating layer 505 in the unwetted regions 510 and 511. In fact, the average thickness of the coating layer 505 in the wetted regions 508 and 509 can be at least about 10% greater than the average thickness of the coating layer 505 in unwetted regions 510 and 511. In still other embodiments, the average thickness of the coating layer 505 in the wetted regions 508 and 509 may be greater, such as on the order of at least about 25% greater, at least about 50% greater, 75% greater, or even 100% greater than the average thickness of the coating layer 505 in the unwetted regions 510 and 511. In particular instances, the average thickness of the coating layer and the wetted regions 508 and 509 is within a range between about 10% and about 200% greater than the average thickness of the coating layer 505 in unwetted regions 510 and 511. For certain abrasive articles, such as illustrated in FIG. 5, the unwetted regions 510 and 511 can be regions that include substantially no coating layer 505 overlying the upper surface of the bonding layer 503.

Figure 8:
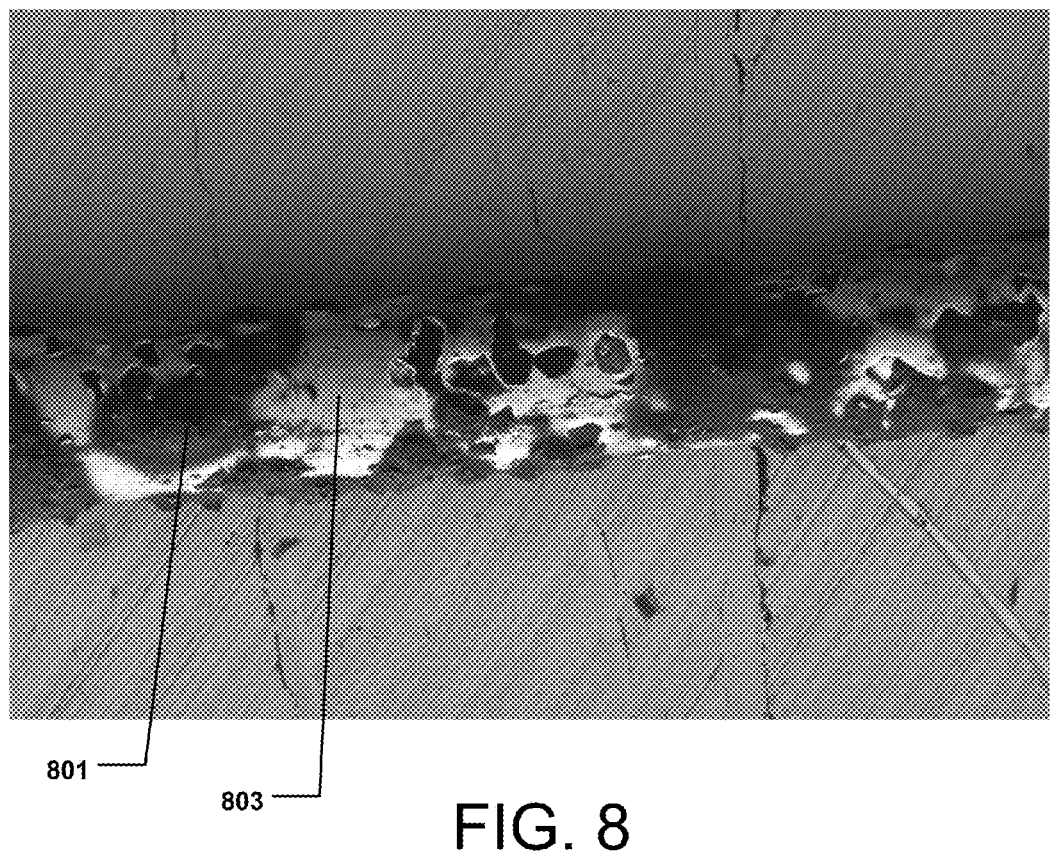
FIG. 8 includes an image of a portion of an abrasive article having a selective coating layer in accordance with an embodiment.

In embodiments utilizing unwetted regions 510 and 511 that are substantially free of a coating layer 505 the distinction between the wetted regions 508 and 509 and unwetted regions 510 and 511 can be considered the difference between areas coated in the coating layer (i.e., wetted region 508 and 509) and those regions that are not coated (unwetted regions 510 and 511). However, in certain embodiments, the unwetted regions 510 and 511 may contain a minor amount of a coating layer 505, such that there may not necessarily be regions that are free of the coating layer 505. In such instances, the wetted regions 508 and 509 can be defined by a circular region extending around each of the abrasive grains 507, wherein the circular region is defined by a wetting region radius that is equal to about twice the average grit size. It will be appreciated, that overlapping of the circular regions surrounding a group of abrasive grains 507, wherein the abrasive grains are tightly grouped, can define a wetted region surrounding the entire group of abrasive grains 507. FIG. 8 includes an image of a portion of an abrasive article having a selective coating layer defining wetted region 801 and unwetted regions 803.

The process of forming the selective coating may facilitate the formation of a coating layer 505 that substantially surrounds a majority content of the abrasive grains 507. That is for example, at least about 50% of the abrasive grains 507 of the total abrasive article 500 are contained within wetted regions 508 and 509. In other embodiments, the portion of abrasive grains contained within the wetted regions 508 and 509 can be greater, such as on the order of at least 60%, at least about 70%, at least about 80%, or even at least about 90% of the abrasive grains of the abrasive article can be contained within wetted regions 508 and 509. Typically, the portion of abrasive grains 507 contained within the wetted 508 and 509 is within a range between about 50% and about 95%.

Figure 6:
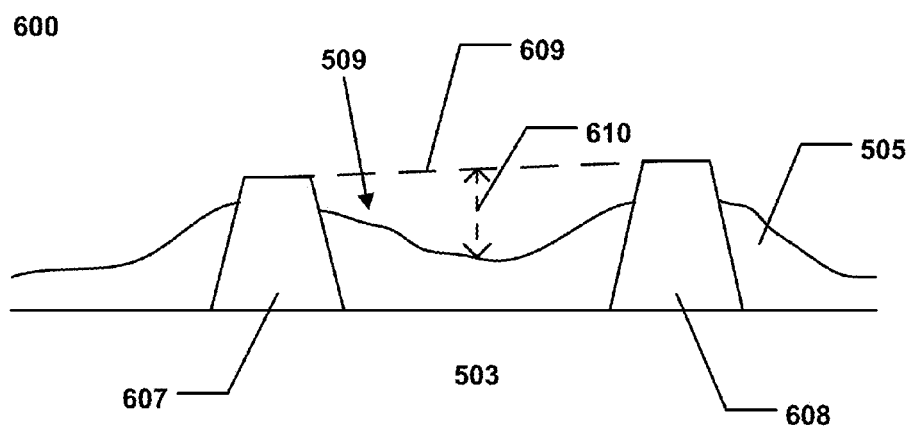
FIG. 6 includes a cross-sectional illustration of a portion of an abrasive article in accordance with an embodiment.

FIG. 6 includes a cross-sectional illustration of a portion of an abrasive article in accordance with an embodiment. The abrasive article 600 includes a bonding layer 503 and abrasive grains 607 and 608 embedded within the bonding layer 503. A coating layer 505 overlies the bonding layer 503 and portions of the abrasive grains 607 and 608. As illustrated in FIG. 6, the coating layer 505 preferentially wets the side surfaces of the abrasive grains 607 and 608 and has a greater thickness along the side surfaces of the abrasive grains 607 and 608 than regions spaced at greater distances from the abrasive grains, such as those regions between the abrasive grains 607 and 608.

Such an article can have improved initial abrasive performance and through its useful lifetime given its improved average chip clearance. The chip clearance for an abrasive article may be calculated as the sum of the distance between adjacent abrasive grains 607 and 608, defined by a line 609 extending between the centers of adjacent abrasive grains 607 and 608, added to a height 610 that is defined as a measurement perpendicular from the median of the line 609 to the upper surface 509 of the coating layer 505 between the abrasive grains 607 and 608. In particular, abrasive articles herein have improved average chip clearance by virtue of parameter controls of the forming process, which in turn facilitates improved abrasive capabilities of the abrasive article.

EXAMPLES

The following describes an exemplary abrasive article formed according to the processes herein. A wire core of high strength steel wire was obtained having an average diameter of approximately 150 microns. The steel wire was coated using an electroplating process with a copper bonding layer such that the bonding layer had an average thickness of approximately 20 microns. Notably, for this example it was determined that 20 microns was sufficient given the size of the abrasive grains to be used.

After electroplating the bonding layer to the wire core, the wire was passed through rollers having abrasive grains attached to the surface of the rollers to facilitate embedding the abrasive grains within the bonding layer. Abrasive grains of diamond having and average diameter of 25 microns were selected, and were embedded within the copper bonding layer at an approximate depth of 10 to 15 microns on average.

The diamond embedded wire was then passed through a coating region comprising three spray guns supplied by Nordson Corp. as Kinetix spray guns. The spray guns were oriented were angled with respect to the wire and spaced apart from each other circumferentially around the wire for uniform application of the coating layer. The distance between the gun nozzle distance and the wire was 75 mm and a 150 mm gun-to-gun distance was used. The wire traveled through the coating region at an average rate of 3.5 km/hr. The coating material was an acrylic material sprayed at an average volume flow rate of 30 cc/min.

Figure 7:
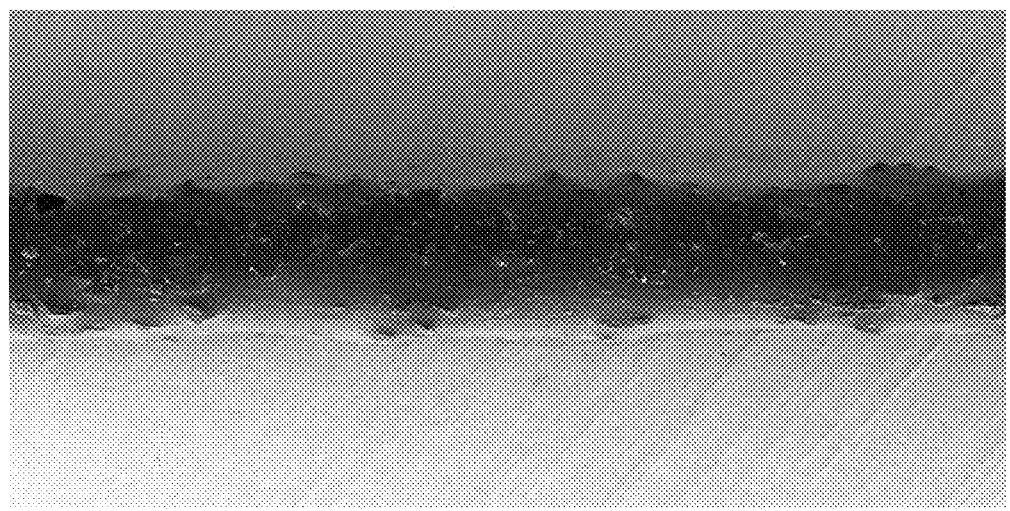
FIG. 7 includes an image of a portion of an abrasive article in accordance with an embodiment.

After application of the coating layer, the wire was translated through a curing region wherein ultraviolet (UV) radiation was directed at the wire to cure the coating layer material. The UV radiation was provided by UV lamps operating at 600 W/in, particularly two, 10 inch diameter lamps, a 10 inch lamp with a D-type bulb and a 10 inch lamp having a H-type bulb. FIG. 7 includes a magnified image of a portion of the abrasive article formed according to the Example.

During a test of slicing through a c-plane sapphire ingot of 3 inches, the wire was able to slice through a total of 10,626 cm2 of sapphire at an average cut rate of 0.11 mm/min on a DWT RTD wire saw machine. The sliced wafers had an average thickness of 750-850 microns, and an average surface roughness of approximately 0.4 microns. A competitor wire was only able to slice through 7,297 cm$^2$ at an average cut rate of 0.12 mm/min before being spent.

The foregoing includes a description of abrasive articles that represent a departure from the state-of-the-art. The abrasive articles herein are directed to wire saw abrasive tools incorporating elongated body members having abrasive grains that are secured to the elongated body via a bonding layer of metal and a coating layer made of a polymer material. In particular, the abrasive articles herein may be suitable for use in wire sawing applications, particularly for the electronics industry, including slicing or sectioning of single crystal or polycrystalline materials that may be used in photovoltaic devices. The embodiments herein incorporate a combination of features including particular relationships between the bonding layer and the size of abrasive grains, the thickness of the bonding layer and the coating layer, the thickness of the coating layer with regard to the grit size of the abrasive grains, selective coatings, preferential wetting of the abrasive grains with the coating layer, and improved abrasive characteristics. These features are made possible and enhanced by the forming processes as described herein.

It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The foregoing Detailed Description includes various features that may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. An abrasive article comprising:
an elongated body;
a bonding layer comprising a metal overlying a surface of the elongated body;
a coating layer comprising a polymer material overlying the boding layer, wherein the coating layer comprises an average thickness ($t_c$) less than an average thickness of the bonding layer ($t_{bl}$); and
abrasive grains contained within the bonding layer and coating layer, wherein a minor amount of the total amount of abrasive grains are contained within the bonding layer and spaced away from the surface of the elongated body.

2. The abrasive article of claim in the currently application 1, wherein the elongated body comprises a thickness:width ratio of at least about 1:2.

3. The abrasive article of claim 1, wherein the metal of the bonding layer comprises a transition metal element.

4. The abrasive article of claim 1, wherein the surface of the elongated body is essentially covered by the bonding layer.

5. The abrasive article of claim 1, wherein the bonding layer comprises an average thickness ($t_{bl}$) at least about 40% of the average grit size of the abrasive grains.

6. The abrasive article of claim 1, wherein the elongated body is a wire.

7. The abrasive article of claim 1, wherein the bonding layer comprises a filler.

8. The abrasive article of claim 7, wherein the filler comprises a particulate.

9. The abrasive article of claim 8, wherein the particulate comprises an average grain size substantially less than an average grit size of the abrasive grains.

10. The abrasive article of claim 8, wherein the particulate comprises a different material than a material of the abrasive grains.

11. The abrasive article of claim 1, wherein the coating layer comprises an average thickness ($t_c$) of not greater than about 50% of an average grit size of the abrasive grains.

12. The abrasive article of claim 1, wherein the coating layer comprises a coating filler material.

13. The abrasive article of claim 1, wherein the abrasive grains comprise a superabrasive material.

14. The abrasive article of claim 1, wherein the abrasive grains consist essentially of diamond.

15. The abrasive article of claim 1, wherein the abrasive grains comprise and average grit size of less than about 200 microns.

16. The abrasive article of claim 1, wherein the abrasive grains are spaced away from the surface of the elongated body at a spacing distance of at least about 2% of the average thickness of the bonding layer ($t_{bl}$).

17. The abrasive article of claim 1, wherein the abrasive grains are embedded within the bonding layer at an average indentation depth ($d_i$) of at least about 40% of an average grit size of the abrasive grains.

18. The abrasive article of claim 1, wherein a portion of the coating includes wetted regions selectively surrounding a portion of the abrasive grains and unwetted regions between a portion of the abrasive grains, the wetted regions having an average thickness of the coating layer that is greater than an average thickness of the coating layer in the unwetted regions.

19. The abrasive article of claim 18, wherein each wetted region is defined by a substantially circular region surrounding an abrasive grain, the substantially circular region having a wetted region radius equal to not greater than about twice the average grit size.

* * * * *